US008403272B2

(12) United States Patent
Ohno

(10) Patent No.: US 8,403,272 B2
(45) Date of Patent: Mar. 26, 2013

(54) CLIP

(75) Inventor: Tatsuya Ohno, Toyota (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 9 days.

(21) Appl. No.: 12/571,730

(22) Filed: Oct. 1, 2009

(65) Prior Publication Data

US 2010/0084520 A1   Apr. 8, 2010

(30) Foreign Application Priority Data

Oct. 3, 2008   (JP) .................................. 2008-258218

(51) Int. Cl.
*F16L 3/00* (2006.01)
*F16M 11/20* (2006.01)

(52) U.S. Cl. ..... 248/73; 248/316.7; 174/164; 174/166 R

(58) Field of Classification Search .................... 248/73, 248/74.1, 74.2, 68.1, 49 M, 61, 62, 71, 222.11, 248/222.12, 309.1, 317.7; 174/68.1, 68.3, 174/163 R, 164, 166 R
See application file for complete search history.

(56) References Cited

U.S. PATENT DOCUMENTS

| | | | | |
|---|---|---|---|---|
| 3,916,089 A | * | 10/1975 | Sloan ............................ | 174/164 |
| 4,386,752 A | * | 6/1983 | Pavlak et al. ................... | 248/73 |
| 4,572,466 A | * | 2/1986 | Yamaguchi et al. ............ | 248/73 |
| 4,763,132 A | * | 8/1988 | Juds et al. ..................... | 343/890 |
| 5,762,397 A | | 6/1998 | Venuto et al. | |
| 5,845,883 A | * | 12/1998 | Meyer .............................. | 248/73 |
| 5,905,231 A | * | 5/1999 | Houte et al. ................. | 174/68.3 |
| 6,062,516 A | * | 5/2000 | Rizzo et al. .................. | 248/74.2 |
| D461,396 S | * | 8/2002 | Ferrill et al. ................... | D8/373 |
| 6,443,403 B1 | * | 9/2002 | Page et al. ........................ | 248/71 |
| 7,090,174 B2 | * | 8/2006 | Korczak et al. ................. | 248/61 |
| 2007/0034769 A1 | * | 2/2007 | Kwilosz ........................ | 248/565 |

FOREIGN PATENT DOCUMENTS

| | | |
|---|---|---|
| JP | 58-63406 | 4/1983 |
| JP | 9-135520 | 5/1997 |
| JP | 2004-360795 | 12/2004 |

OTHER PUBLICATIONS

Japan Office action, dated Dec. 16, 2011 along with an english translation thereof.

* cited by examiner

*Primary Examiner* — Tan Le
(74) *Attorney, Agent, or Firm* — Greenblum & Bernstein, P.L.C.

(57) ABSTRACT

A clip for attaching a wire member to a panel member is provided. The clip includes a head part provided with a wire insertion hole capable of holding the wire member a main part supporting the head part and locking means for fitting the main part to a fitting hole of the panel member. The main part is a single body. An inside and an outside of the wire insertion hole are not communicated with each other in a radial direction thereof.

20 Claims, 8 Drawing Sheets

# CLIP

BACKGROUND OF THE INVENTION

1. Field of the Invention

The present invention relates to a clip, and more particularly, to a clip for attaching a wire member to a panel member.

2. Description of the Related Art

U.S. Pat. No. 5,762,397 describes a clip for attaching a wire member to a panel member. In this art, as shown in FIG. 8, a clip 101 includes a head part 110 having a wire insertion hole 112 capable of holding a flexible spring (not shown) which is a wire member for supporting a pad of a seat back, a main part 120 for supporting this head part 110, and locking means 130 capable of fitting this main part 120 to a fitting hole in a plate which is a panel member (both of which are not shown). The flexible spring is passed through the wire insertion hole 112 through a slit 122 which is formed in the main part 120 to be held in a clamped manner. In a state where the flexible spring is thus held, the main part 120 can be fitted to the plate with the locking means 130. Accordingly, the flexible spring can be attached to the plate by means of the clip 101.

However, in the above-described clip 101, the locking means 130 is composed of a pair of legs 140, 140 and a pair of arms 150, 150, and the main part 120 is fitted to the plate by utilizing a repulsive force of flexure which is exerted on the pair of legs 140, 140. On this occasion, since the slit 122 is provided in an opposite direction to a direction in which the repulsive force is exerted, the repulsive force is likely to escape through the slit 122. As the result, such a problem that fitting capability of the clip 101 is deteriorated has sometimes happened.

SUMMARY OF THE INVENTION

It is an aspect of the present invention to provide a clip which has sufficient fitting capability with respect to a panel member even when the clip is provided with a wire insertion hole capable of holding a wire member.

According to an exemplary embodiment of the present invention, there is provided a clip for attaching a wire member to a panel member, comprising: a head part provided with a wire insertion hole capable of holding the wire member; a main part supporting the head part; and locking means for fitting the main part to a fitting hole of the panel member. The main part is a single body, and an inside and an outside of the wire insertion hole are not communicated with each other in a radial direction thereof.

According to another exemplary embodiment of the present invention, there is provide a clip for attaching a wire member to a panel member, comprising: a head part having a generally cylindrical shape and provided with a wire insertion hole capable of holding the wire member; a main part extends from the head part downwardly; a pair of arms which extend from a base end of the main part; a pair of legs, one of which extends from one side of a distal end of the main part, and the other of which extends from an opposite side of the distal end of the main part.

DETAILED DESCRIPTION

Figure 1:
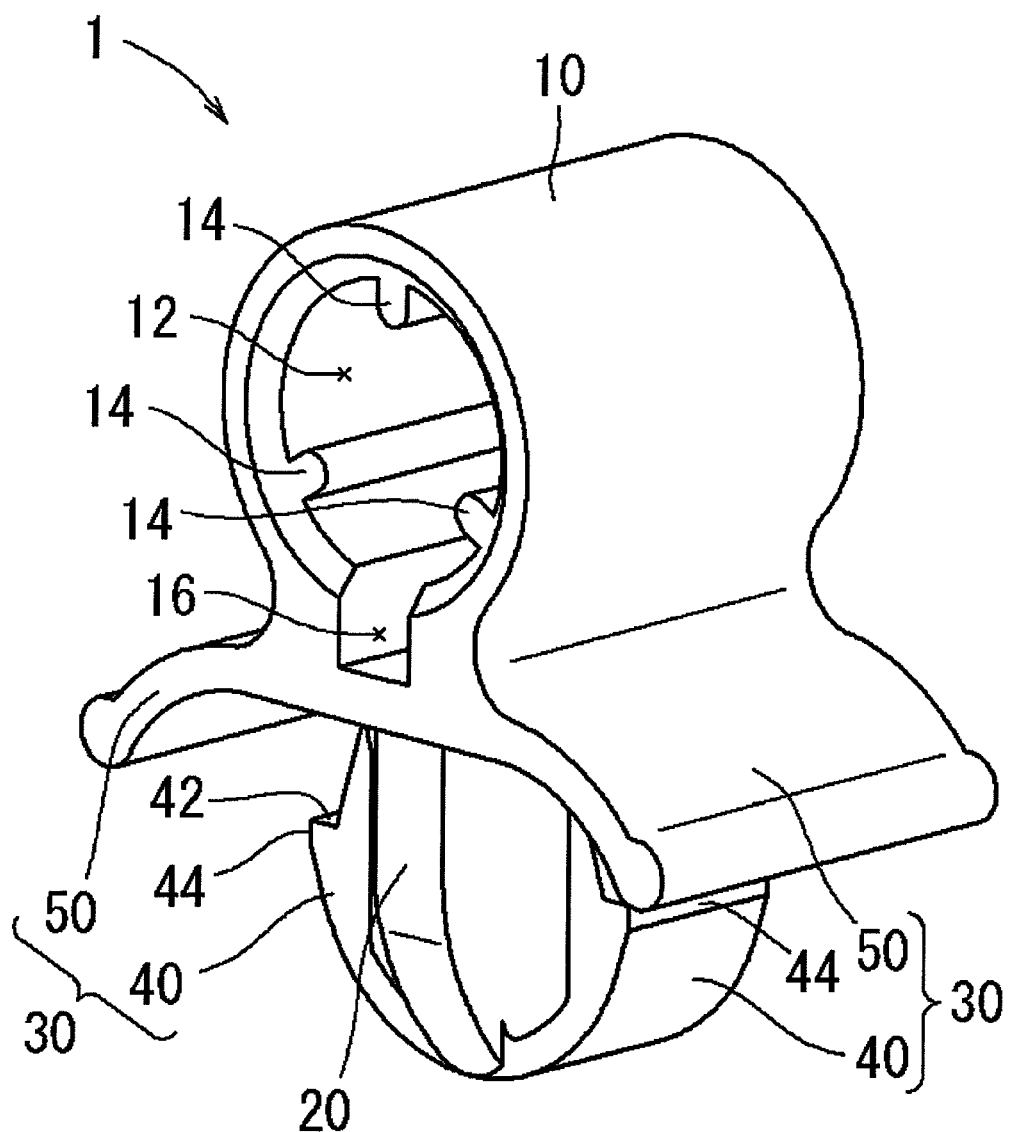
FIG. 1 is a perspective view showing an entirety of a clip according to an exemplary embodiment of the present invention.
Figure 2:
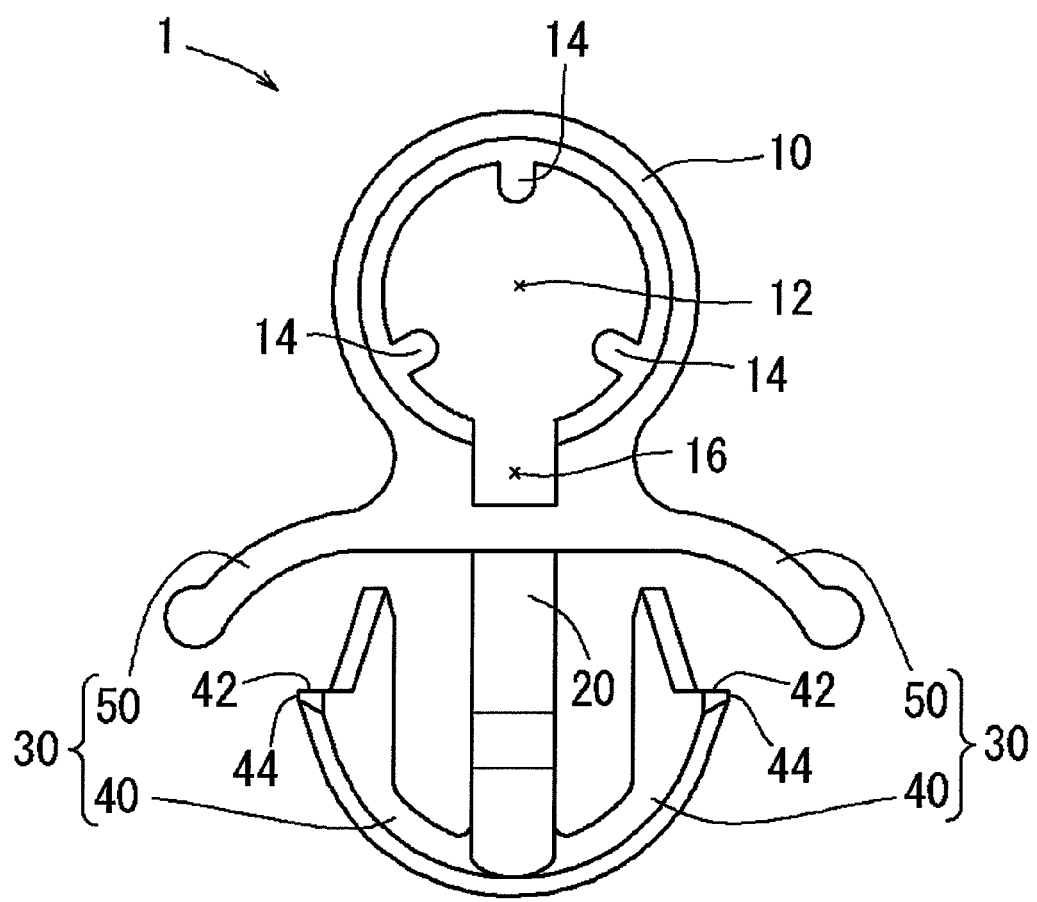
FIG. 2 is a front view of the clip shown in FIG. 1.
Figure 3:
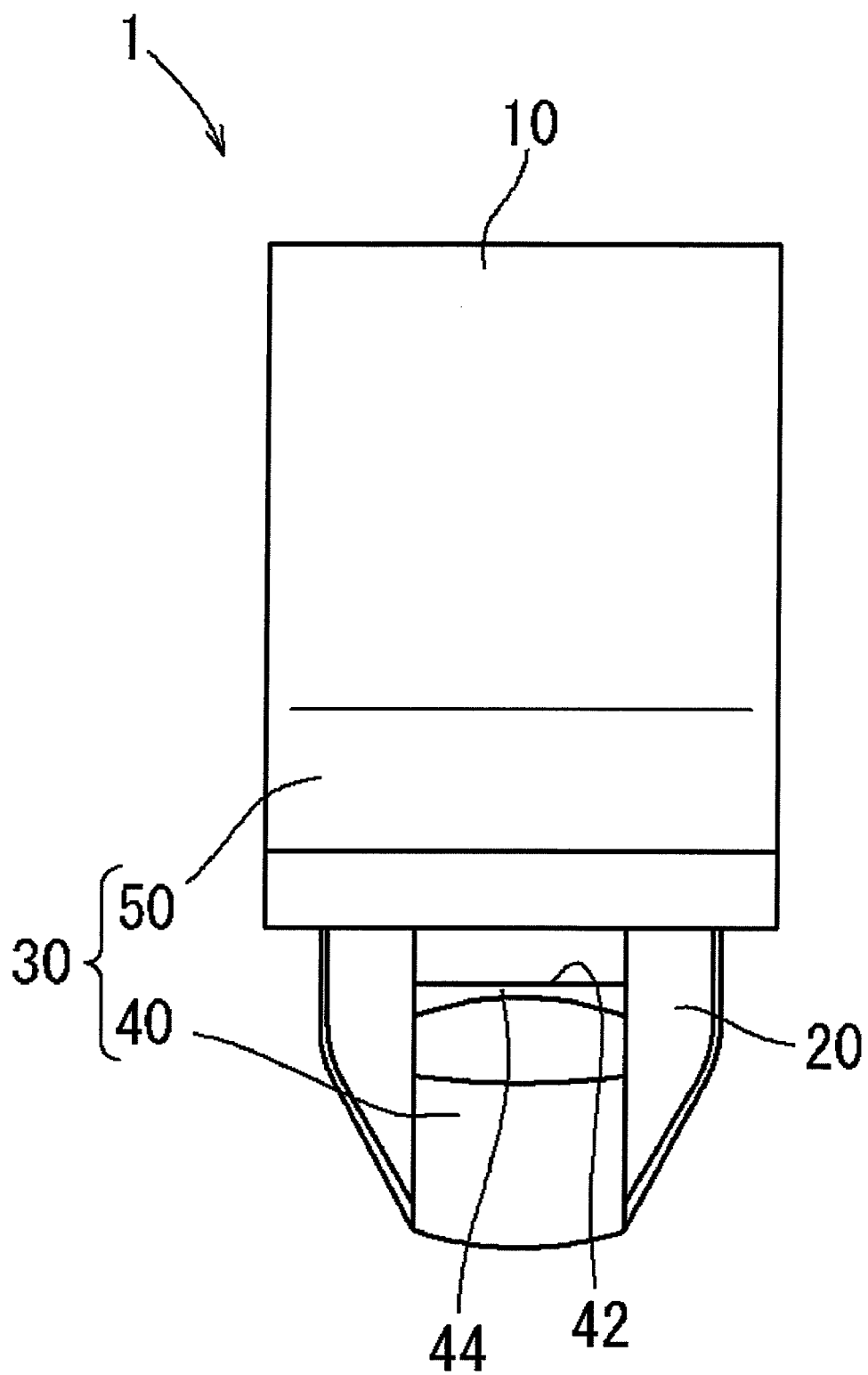
FIG. 3 is a right side view of the clip shown in FIG. 1.
Figure 4:
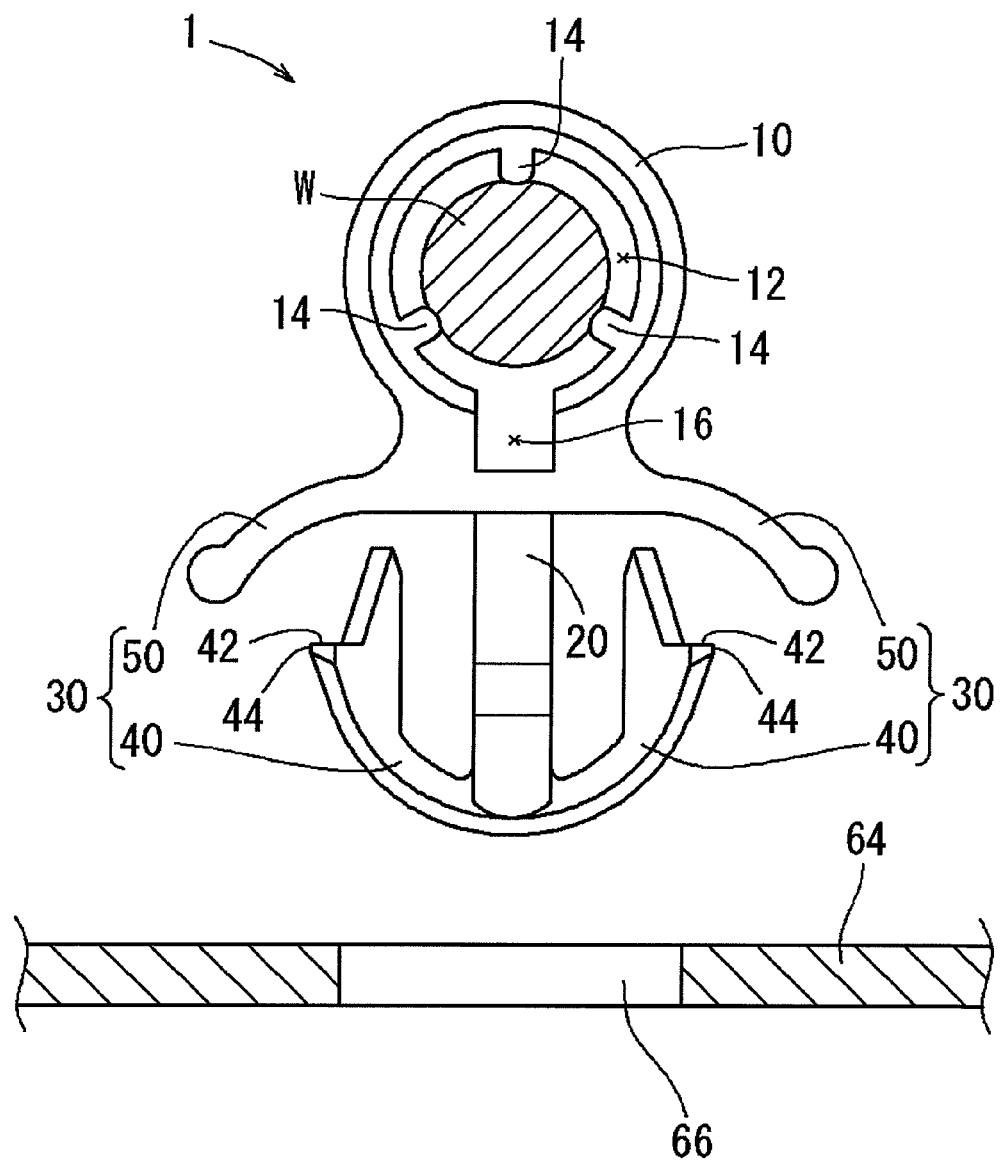
FIG. 4 is an explanatory view showing a state before the clip is fitted to a plate.
Figure 5:
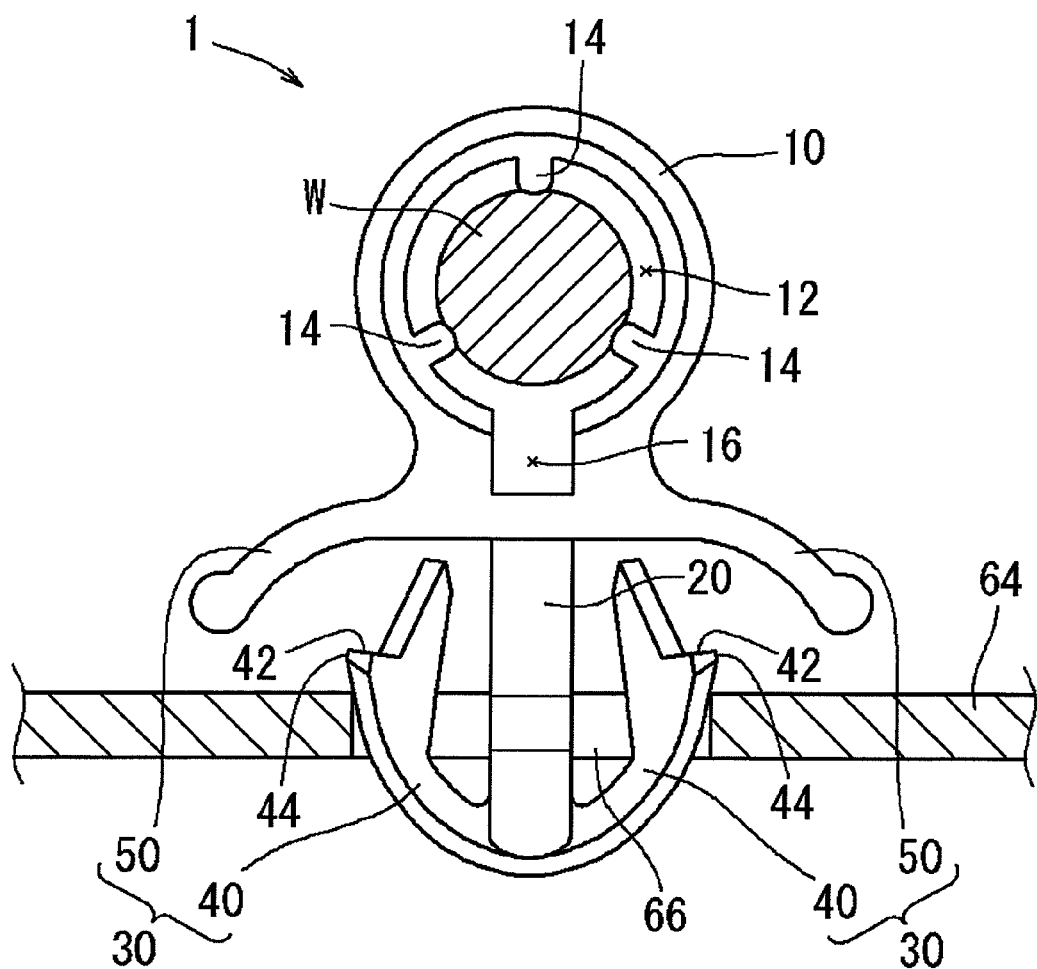
FIG. 5 is an explanatory view showing a state while the clip is fitted to the plate.
Figure 6:
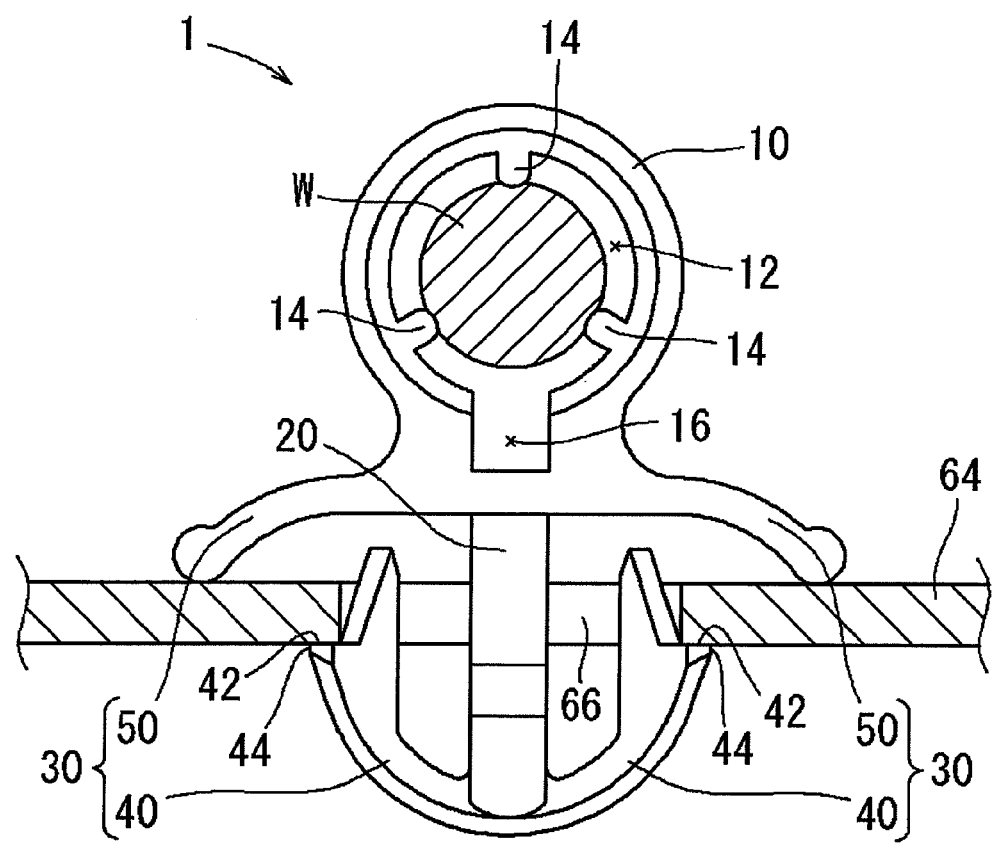
FIG. 6 is an explanatory view showing a state where the clip has been fitted to the plate.
Figure 7:
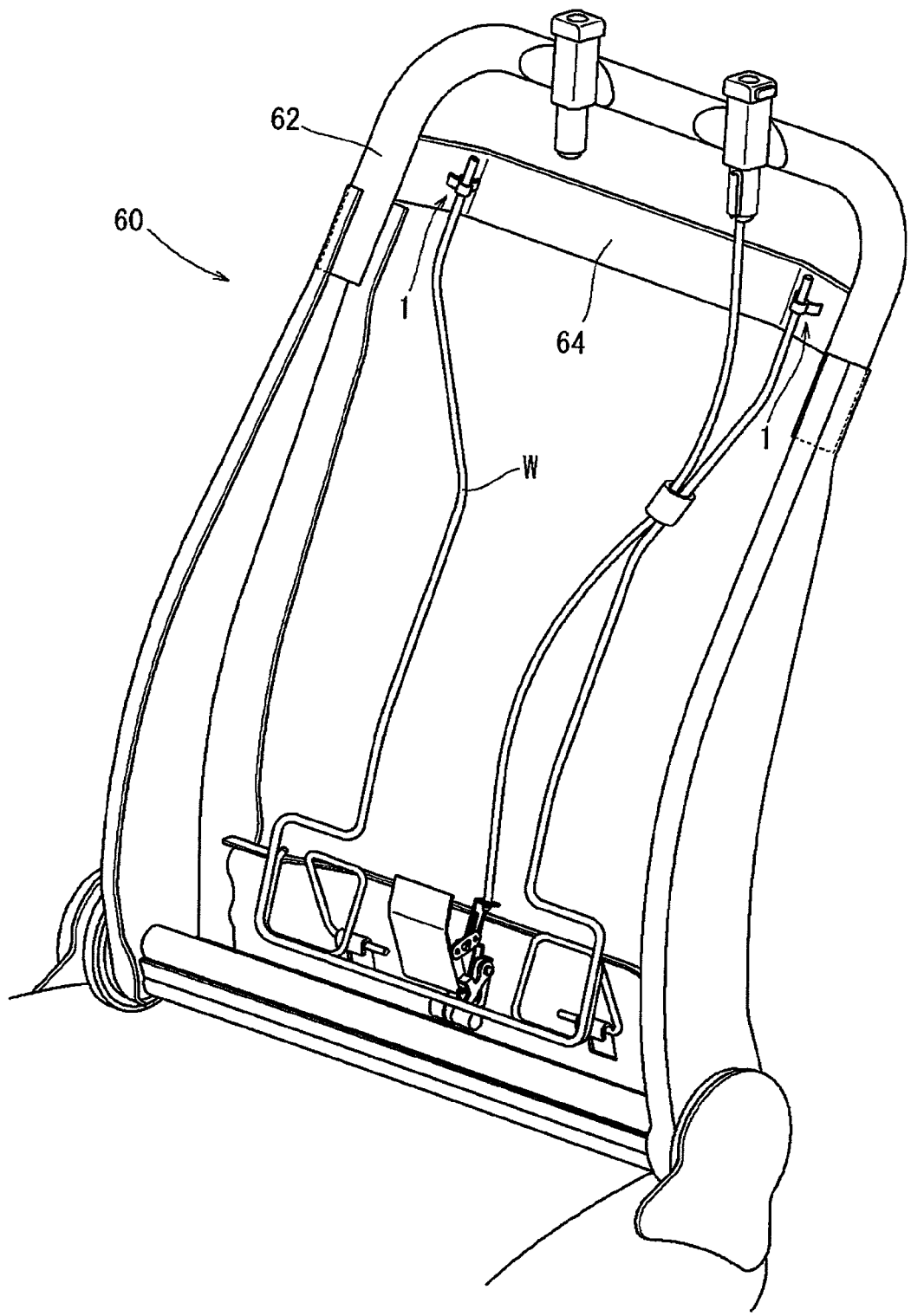
FIG. 7 is an explanatory view showing an example in which the clip is used.

Exemplary embodiments of the present invention will be described with reference to FIGS. 1 to 7. FIG. 1 is a perspective view showing an entirety of a clip according to an exemplary embodiment of the present invention. FIG. 2 is a front view of the clip shown in FIG. 1. FIG. 3 is a right side view of the clip shown in FIG. 1. FIG. 4 is an explanatory view showing a state before the clip is fitted to a plate. FIG. 5 is an explanatory view showing a state while the clip is fitted to the plate. FIG. 6 is an explanatory view showing a state where the clip has been fitted to the plate. FIG. 7 is an explanatory view showing an example in which the clip is used.

Firstly, a clip 1 will be described with reference to FIGS. 1 to 3. As shown in these drawings, the clip 1 has a head part 10, a main part 20, and locking means 30. In the following description, these members 10, 20, 30 will be described separately.

The head part 10 is a part for holding a wire member (not shown in FIGS. 1 to 3). For this purpose, the head part 10 is provided with a wire insertion hole 12 capable of holding the wire member. This wire insertion hole 12 is designed to hold the wire member, by passing an end portion of the wire member through the hole. An inside and an outside of the wire insertion hole 12 are not communicated with each other in a radial direction. In other words, the head part 10 has a generally cylindrical shape. The wire insertion hole 12 is provided with three ribs 14 on an inner peripheral face thereof. The ribs extend along an inserting direction of wire member, which is an axial direction of the head part 10. It is advantageous that the three ribs 14 be provided at an equal interval in a circumferential direction of the wire insertion hole 12. Additionally, a slit 16 is formed on the inner peripheral face of the wire insertion hole 12 at a bottom portion along the inserting direction of the wire member.

Figure 8:
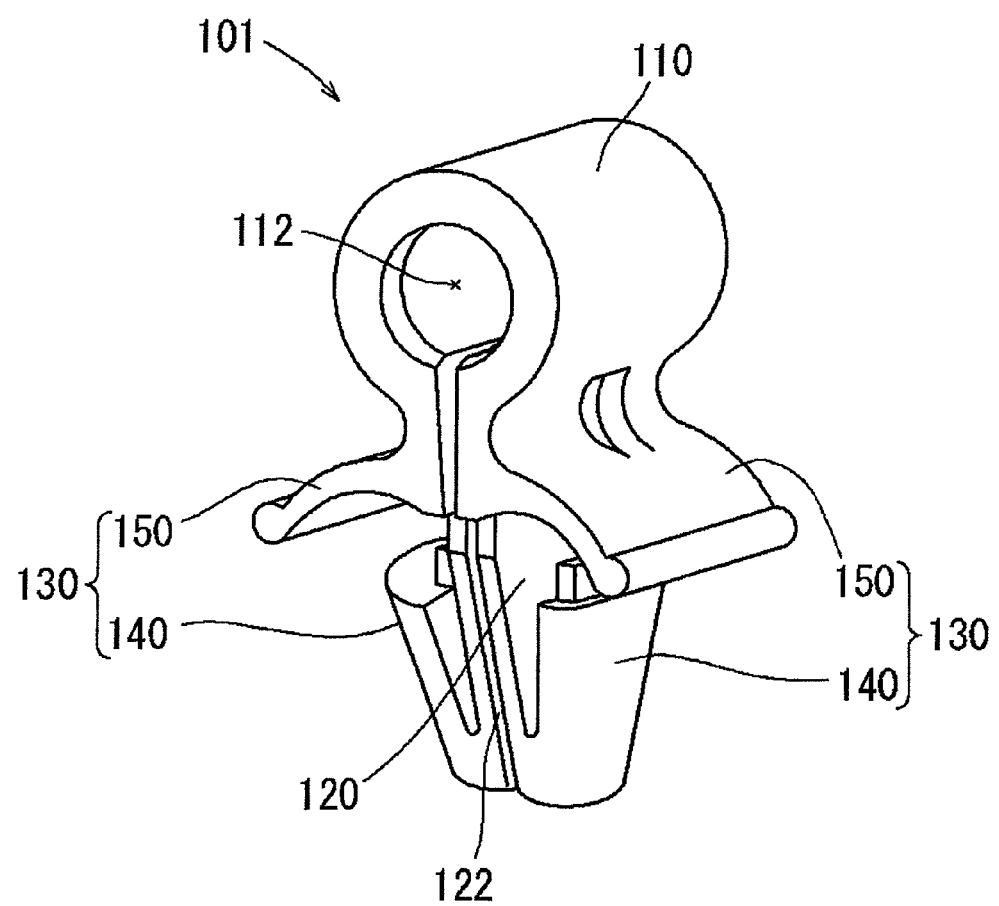
FIG. 8 is a perspective view showing an entirety of a clip according to a prior art.

The main part 20 is a part for supporting the above-described head part 10, and is adapted to be inserted into a fitting hole of a panel member. This main part 20 is integrally formed. Specifically, this main part 20 does not have such a structure that it is separated by a slit 122, unlike the prior-art main part 120 shown in FIG. 8. Further, as shown in FIGS. 1 to 3, the main part 20 is a single body having inclined faces at sides of a distal end thereof, which are not provided with a pair of legs 40, 40 described later. That is, the sides of the main part 20 extend from the head part 10 downwardly and then extend obliquely from a middle portion so that the both sides approach. In the height direction, the middle portion is provided between the distal end of the main part 20 and stepped parts 42 of the pair of legs 40, 40 described later. It is noted that the cross section of the main part 20 according to this embodiment has a rectangular shape, but may has a circular shape, ellipse or any polygonal shape. That is, the main part 20 may have a single plate shape or a single rod shape.

The locking means 30 is a means for fitting the clip 1 to the panel member, by inserting the main part 20 into the fitting hole of the panel member. For this purpose, the locking means 30 includes a pair of legs 40, 40 and a pair of arms 50, 50.

The pair of legs 40, 40 of the locking means 30 are adapted to be engaged with the fitting hole of the panel member. For this purpose, the pair of legs 40, 40 are respectively formed in a shape turned back from a distal end of the main part 20 in opposite directions symmetrical with respect to an axis of the main part 20. In other words, one of the pair of legs 40, 40 extends from one side of the distal end of the main part obliquely upward, and the other of the pair of legs 40, 40 extends from the other (opposite) side of the distal end of the main part obliquely upward. The bottom face of the pair of legs 40, 40 forms a continuous face and has a substantially circular arc shape. Moreover, the pair of legs 40, 40 are designed so that both distal end portions thereof can be flexed and deformed so as to approach each other. Further, the pair of legs 40, 40 are provided with stepped parts 42 so that the wall thickness of the distal end portions thereof become smaller, respectively.

The pair of arms 50, 50 are adapted to clamp the panel member with the stepped parts 42, 42 of the pair of legs 40, 40, thereby preventing the pair of legs 40, 40 from being disengaged from an engagement state with the fitting hole of the panel member. For this purpose, the pair of arms 50, 50 extend from a base end of the main part 20 to separate from each other and oppose the stepped parts 42, respectively. Moreover, the pair of arms 50, 50 are so formed that the distal end portions thereof are inclined downward. Further, the pair of arms 50, 50 are so designed that both the distal end portions thereof can be flexed and deformed upward.

These members 10, 20, 30 (40, 50) are formed by integral molding from synthetic resin having rigidity. In other words, the clip 1 is formed as an integrally molded product.

Next, with reference to FIGS. 4 to 7, steps for using the above-described clip 1 will be described. Herein, there will be described an example in which a flexible spring W for supporting a pad member (not shown) is attached to a plate 64 of a back frame 62 of a seat back 60 by means of the clip 1.

As a first step, as shown in FIG. 4, one end of the flexible spring W is inserted into the wire insertion hole 12 of the clip 1, whereby the flexible wire W is held by the clip 1. From this state, the distal end of the main part 20 of the clip 1 is pushed into a fitting hole 66 of the plate 64. Then, as shown in FIG. 5, the pair of legs 40, 40 of the clip 1 start to be flexed so as to approach each other.

In this flexed state, the main part 20 of the clip 1 is further pushed into the fitting hole 66. As shown in FIG. 6, when both protruded parts 44 of the pair of legs 40, 40 have passed the fitting hole 66 of the plate 64, both the distal end portions of the pair of legs 40, 40 abut against an inner peripheral face of the fitting hole 66 of the plate 64 with the above-described repulsive force of the flexure. In this manner, the clip 1 is held in a state engaged with the fitting hole 66 of the plate 64.

In this state, the plate 64 is clamped between the stepped parts 42 of the pair of legs 40, 40 and the pair of arms 50, 50. Accordingly, the clip 1 can be prevented from being disengaged from the engagement state with the fitting hole 66 of the plate 64. Moreover, in this state, both the distal end portions of the pair of arms 50, 50 are pressed against a surface of the plate 64. Therefore, due to a repulsive force of this pressure, the clip 1 can be firmly held also in a thickness direction of the plate 64. In this manner, it is possible to attach the flexible wire W for supporting the pad member to the plate 64 of the back frame 62 of the seat back 60, by means of the clip 1 (See FIG. 7).

As described above, according to the clip 1 of the exemplary embodiment, it is possible to prevent an escape of the repulsive force of the flexure which is exerted on the pair of legs 140, 140 in the prior art since the slit 122 in the prior art clip 101 is not provided. Therefore, it is possible to enhance the fitting capability of the clip 1 with respect to the plate 64.

Moreover, according to the above-described clip 1, the three ribs 14 are formed on the inner peripheral face of the wire insertion hole 12. Therefore, even if the outer diameter of the flexible wire W varies, the clip 1 can hold the flexible wire W while absorbing such variation.

Further, according to the above-described clip 1, the slit 16 is formed on the inner peripheral face of the wire insertion hole 12 along the inserting direction of the flexible wire W. Accordingly, when the flexible wire W is inserted into the wire insertion hole 12, the inner diameter of the wire insertion hole 12 can be enlarged due to the slit 16, and therefore, the flexible wire W can be easily inserted.

While the present invention has been shown and described with reference to certain exemplary embodiments thereof, it will be understood by those skilled in the art that various changes in form and details may be made therein without departing from the spirit and scope of the invention as defined by the appended claims.

For example, in the above-described exemplary embodiment, the flexible wire W is held by the clip 1. However, the present invention is not limited thereto. For example, a cable member may be held by the clip 1.

Further, in the above-described exemplary embodiment, an extending direction of the pair of legs 40 is parallel to an extending direction of the pair of arms 50. However, the present invention is not limited thereto. For example, the extending direction of the pair of legs 40 may be orthogonal to the extending direction of the pair of arms 50.

What is claimed is:

1. A clip for attaching a wire member to a panel member, the clip comprising:
   a head part provided with a wire insertion hole capable of holding the wire member;
   a main part supporting the head part; and
   a lock for fitting the main part to a fitting hole of the panel member,
   wherein the main part is a single body,
   wherein an uninterrupted inner peripheral surface of the head part defines and completely encloses the wire insertion hole,
   wherein the uninterrupted peripheral surface includes a slit defined therein, and the slit is disposed at a bottom side of the head part and axially aligned with the main part,
   wherein the uninterrupted peripheral surface of the head part and the slit form a closed loop, and wherein
   the head part, the main part and the lock are configured as an integral molded product formed by integral molding.

2. The clip according to claim 1, wherein the main part has a single plate shape or a single rod shape.

3. The clip according to claim 1, wherein a plurality of ribs are formed on the inner peripheral surface of the wire insertion hole.

4. The clip according to claim 3, wherein the plurality of ribs are formed at an equal interval in a circumferential direction of the wire insertion hole.

5. The clip according to claim 4, wherein the number of the ribs is three.

6. The clip according to claim 1, wherein the slit extends along an inserting direction of the wire member.

7. The clip according to claim 1, wherein the lock includes a pair of legs and a pair of arms,
   wherein one of the pair of legs extends from one side of a distal end of the main part obliquely upward, and the other of the pair of legs extends from the other side of the distal end of the main part obliquely upward, and wherein the pair of arms are provided to oppose the pair of legs.

8. The clip according to claim 7, wherein each of the legs has a stepped part at a distal end thereof, and wherein when the clip is fitted to the panel member, the arms and the stepped parts of the legs clamp the panel member, respectively.

9. The clip according to claim 8, wherein sides of the main part extend from the head part downwardly and then extend obliquely from a middle portion so as to approach each other, and wherein the middle portion is provided between the distal end of the main part and the stepped parts.

10. A clip for attaching a wire member to a panel member, the clip comprising:

a head part that has a generally cylindrical shape and an inner peripheral surface including a slit that defines a wire insertion hole capable of holding the wire member, the inner peripheral surface, including the slit, completely surrounds and encloses the wire insertion hole to form a closed loop;

a main part that extends from the head part downwardly and is axially aligned with the slit, which is disposed at a bottom side of the head part;

a pair of arms which extend from a base end of the main part; and a pair of legs, one of which extends from one side of a distal end of the main part, and the other of which extends from an opposite side of the distal end of the main part, wherein the head part, the main part, the pair of arms and the pair of legs are configured as an integral molded product formed by integral molding.

11. The clip according to claim 10, wherein a plurality of ribs are formed on the inner peripheral surface of the wire insertion hole at an equal interval in a circumferential direction thereof, and wherein the slit extends along an axial direction of the head part.

12. The clip according to claim 11, wherein a bottom face of the pair of legs forms a continuous face and has a substantially circular arc shape.

13. The clip according to claim 1, wherein the main part extends orthogonally from a central axis of the wire insertion hole.

14. The clip according to claim 10, wherein the main part extends orthogonally from a central axis of the wire insertion hole.

15. The clip according to claim 7, wherein the pair of arms is configured to clamp an upper side of the panel member and the pair of legs is configured to clamp a lower side of the panel member.

16. The clip according to claim 10, wherein the pair of arms is configured to clamp an upper side of the panel member and the pair of legs is configured to clamp a lower side of the panel member.

17. The clip according to claim 1, wherein the main part extends radially from the head part, and wherein the inner peripheral surface of the head part defining the wire insertion hole is not in communication with an outer peripheral surface of the clip.

18. The clip according to claim 10, wherein the main part extends radially from the head part, and wherein the inner peripheral surface of the head part defining the wire insertion hole is not in communication with an outer peripheral surface of the clip.

19. The clip according to claim 1, wherein the wire insertion hole is separated from the main part by a portion of the lock to prevent passage of the wire therethrough.

20. The clip according to claim 10, wherein the wire insertion hole is separated from the main part to prevent passage of the wire therethrough.

* * * * *